United States Patent [19]

Folkers

[11] 4,248,607

[45] Feb. 3, 1981

[54] CTR FUEL RECOVERY SYSTEM USING REGENERATION OF A MOLECULAR SIEVE DRYING BED

[75] Inventor: Charles L. Folkers, Livermore, Calif.

[73] Assignee: The United States of America as represented by the United States Department of Energy, Washington, D.C.

[21] Appl. No.: 50,240

[22] Filed: Jun. 20, 1979

Related U.S. Application Data

[63] Continuation of Ser. No. 730,760, Oct. 8, 1976, abandoned.

[51] Int. Cl.³ .................... B01D 53/04; B01D 53/26
[52] U.S. Cl. ........................................ 55/33; 55/62; 55/75; 55/208; 55/389
[58] Field of Search ............... 55/33, 59, 62, 75, 208, 55/389

[56] References Cited

U.S. PATENT DOCUMENTS

| | | | |
|---|---|---|---|
| 2,699,837 | 1/1955 | Van Note | 55/33 X |
| 3,078,634 | 2/1963 | Milton | 55/75 X |
| 3,359,706 | 12/1967 | Zankey | 55/62 X |
| 3,531,916 | 10/1970 | Kulperger et al. | 55/33 |
| 3,534,529 | 10/1970 | Mattia | 55/62 |
| 3,712,027 | 1/1973 | Hasz | 55/33 |

OTHER PUBLICATIONS

Linde Molecular Sieves, Linde Co., 11/12/1957, "Dry Gas".
R. W. Moir et al., Progress on the Conceptual Design of a Mirror Hybrid Fusion–Fission Reactor, ms. date 6/25/75, UCRL-51797, Lawrence Livermore Laboratory.

*Primary Examiner*—Robert H. Spitzer
*Attorney, Agent, or Firm*—James E. Denny; Roger S. Gaither; L. E. Carnahan

[57] ABSTRACT

A primary molecular sieve drying bed is regenerated by circulating a hot inert gas through the heated primary bed to desorb water held on the bed. The inert gas plus water vapor is then cooled and passed through an auxiliary molecular sieve bed which adsorbs the water originally desorbed from the primary bed. The main advantage of the regeneration technique is that the partial pressure of water can be reduced to the $10^{-9}$ atm. range. This is significant in certain CTR applications where tritiated water ($T_2O$, HTO) must be collected and kept at very low partial pressure.

8 Claims, 4 Drawing Figures

CTR FUEL RECOVERY SYSTEM USING REGENERATION OF A MOLECULAR SIEVE DRYING BED

This is a continuation of application Ser. No. 730,760, filed Oct. 8, 1976, now abandoned.

BACKGROUND OF THE INVENTION

The invention described herein was made in the course of, or under, Contract No. W-7405-ENG-48, with the Energy Research and Development Administration.

The invention relates to regeneration of molecular sieve drying beds, and particularly to a regeneration technique using an auxiliary molecular sieve bed whereby the partial pressure of water can be reduced to a very low level.

Molecular sieves (complex aluminum-silicates) are widely used for drying gases. When the drying bed reaches its adsorption capacity, it is regenerated by passing a hot inert gas through the bed to drive off (desorb) the adsorbed water. In these prior systems, a circulating inert gas is heated and passed through the "saturated" molecular sieve bed to desorb the adsorbed water. The moist gas is then cooled below its dew point and passed through a liquid-gas separator. The separated water is drained, and the dry gas phase is recirculated through the system. This prior type of regeneration system is capable of reducing the partial pressure of water ($P_w$) in the drying bed to about $10^{-7}$ atm., when it is returned to normal service. While this is adequate in most cases, certain critical applications occur where $P_w$ must be maintained at much lower levels. For example, in certain controlled thermonuclear reactor (CTR) applications tritiated water ($T_2O$, HTO) must be collected and $P_w$ maintained in the range of $10^{-9}$ atm. This $P_w$ level is a factor of 100 lower than that obtainable with conventional systems for regenerating molecular sieve dryers. Thus, a need exists in the molecular sieve drying field for a regeneration technique capable of maintaining the $P_w$ at the $10^{-9}$ or lower level.

SUMMARY OF THE INVENTION

The present invention is an improved system for regenerating molecular sieve drying beds, which basically involves utilizing an auxiliary molecular sieve bed whereby enhanced drying of the inert gas lowers the $P_w$ to $10^{-9}$ and possibly $10^{-10}$ atmospheres, thereby filling the above-mentioned need. Thus, the invention has particular CTR applications where tritiated water ($T_2O$, HTO) must be collected and kept at very low partial pressure.

Therefore, it is an object of this invention to provide an improved technique for the regeneration of molecular sieve drying beds.

A further object of the invention is to provide a molecular sieve drying bed regeneration system utilizing an auxiliary drying bed.

Another object of the invention is to provide regeneration of molecular sieve drying beds wherein the partial pressure of water can be reduced to at least the $10^{-9}$ atm. range.

Another object of the invention is to provide regeneration of molecular sieve drying beds utilized in CTR applications where tritiated water must be collected and kept at very low partial pressure.

Another object of the invention is to provide a means whereby tritiated water can be readily recovered after its storage at very low partial pressures, in order to permit further processing of the valuable tritium.

Another object of the invention is a means of regenerating molecular sieve drying beds to extremely low residual loadings of tritiated water while concurrently maintaining the tritiated water recovered thereby on an auxiliary molecular sieve bed in an essentially solid (adsorbed) state, thereby minimizing the possibility of accidental release as liquid or vapor of the dangerous, radioactive tritiated water.

Other objects of the invention will become readily apparent to those skilled in the art from the following description and accompanying drawings.

DESCRIPTION OF THE INVENTION

The invention is directed to an improved method and apparatus for regenerating molecular sieve drying beds. The main advantage of the regeneration system of the invention is that the partial pressure of water can be reduced to the $10^{-9}$ atm. range or lower, which is of particular importance in controlled thermonuclear reactor (CTR) applications where tritiated water ($T_2O$, HTO) must be collected and kept at very low partial pressure.

Figure 1:
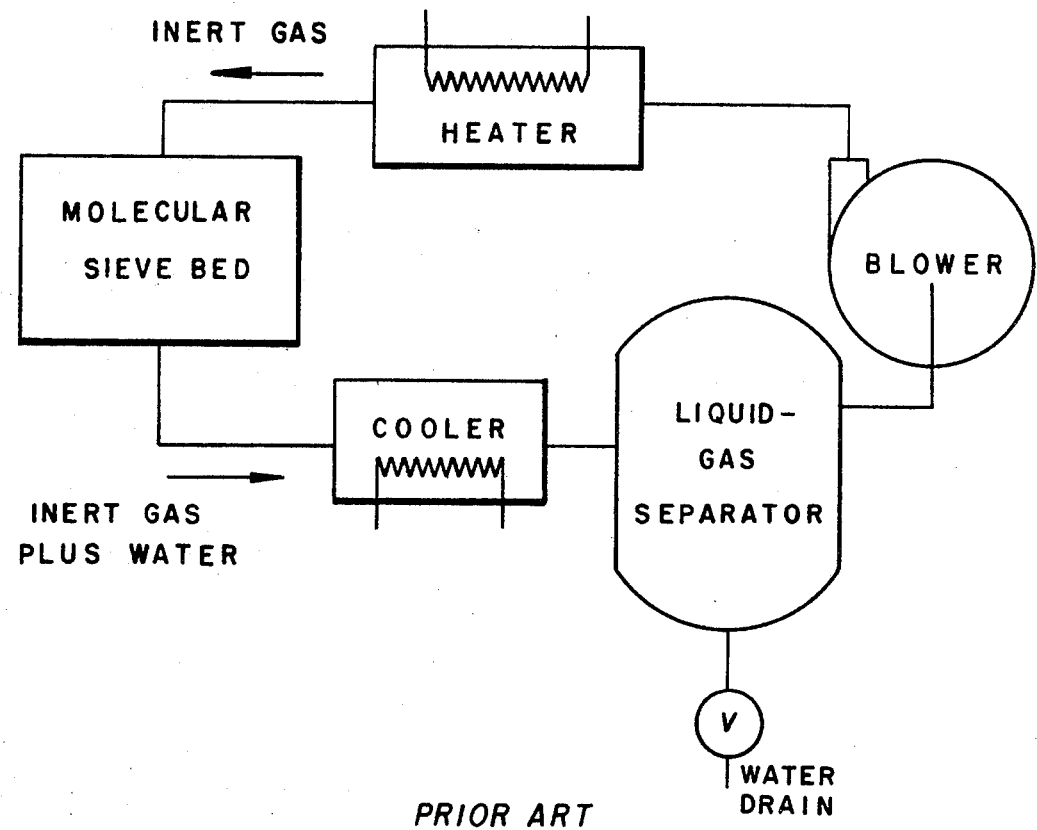
FIG. 1 is a schematic view of the prior art system.

As pointed out above, molecular sieves (complex aluminum-silicates) are widely used for drying gases, and when the drying bed reaches its adsorption capacity it is regenerated by passing a hot inert gas through the bed to drive off or desorb the adsorbed water. FIG. 1 illustrates a conventional system for regenerating a molecular sieve bed. A circulating inert gas is heated by the heater assembly and passed through the "saturated" molecular sieve bed, as indicated by the flow arrows, to desorb the adsorbed water in the bed, whereafter the moist inert gas is then cooled by the cooler assembly to below its dew point and passed, as indicated by the flow arrow, through a liquid-gas separator. The separated water is drained from the bottom of the separator and the dry gas phase is recirculated through the molecular sieve bed via a blower and the heater, as indicated by flow arrows.

While the prior known regeneration systems are capable of reducing the partial pressure of water ($P_w$) in the drying bed to about $10^{-7}$ atmosphere (atm.) and is thus adequate for most applications, certain critical applications occur where the $P_w$ must be maintained at much lower levels, such as $10^{-9}$ atm., a factor of 100 lower than obtainable with the conventional system of FIG. 1.

Figure 2:
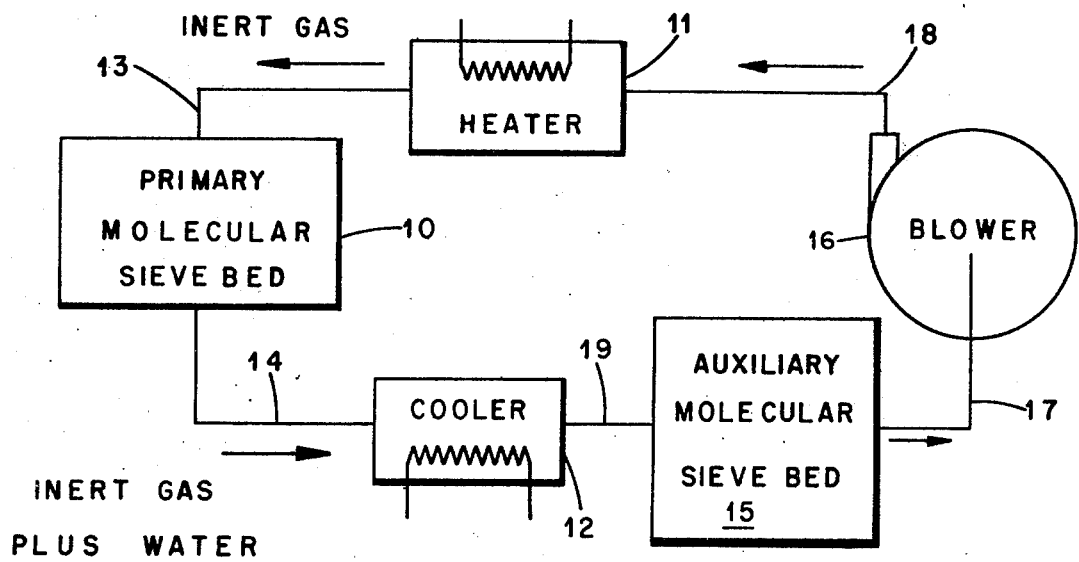
FIG. 2 is a schematic view of the regeneration system of the invention.

FIG. 2 illustrates the regeneration system of the present invention and basically involves replacing the liquid-gas separator of the FIG. 1 system with an auxiliary molecular sieve bed. The enhanced drying of the inert gas obtainable with the auxiliary bed lowers the $P_w$ to $10^{-9}$ to $10^{-10}$ atmospheres. Thus, CTR applications using tritiated water ($T_2O$, HTO) which must be collected and kept at very low partial pressure can effectively incorporate the improved regenerating system.

As shown in FIG. 2 the improved regeneration system comprises a primary molecular sieve bed 10 having an inlet connected to an outlet of a heater 11 and an outlet connected to an inlet of a cooler 12 via tubing indicated at 13 and 14, respectively, with an auxiliary molecular sieve bed 15 connected to the inlet of heater 11 via a blower 16 and tubing 17 and 18, and connected to the outlet of cooler 12 via tubing 19. Thus, as indicated by the flow arrows and legends, inert gas is circulated by blower 16 through heater 11 where it is heated and directed through primary bed 10 to desorb or pickup water held on the bed, whereafter the inert gas plus water (water vapor) is cooled in cooler 12 and passed through auxiliary bed 15 which adsorbs the water originally desorbed from the primary bed, the dry gas phase from auxiliary bed 15 is recirculated by blower 16 through the system. The inert gas may be composed of helium, argon, air, other gases not adsorbed by the molecular sieves, or mixtures thereof.

Figure 3:
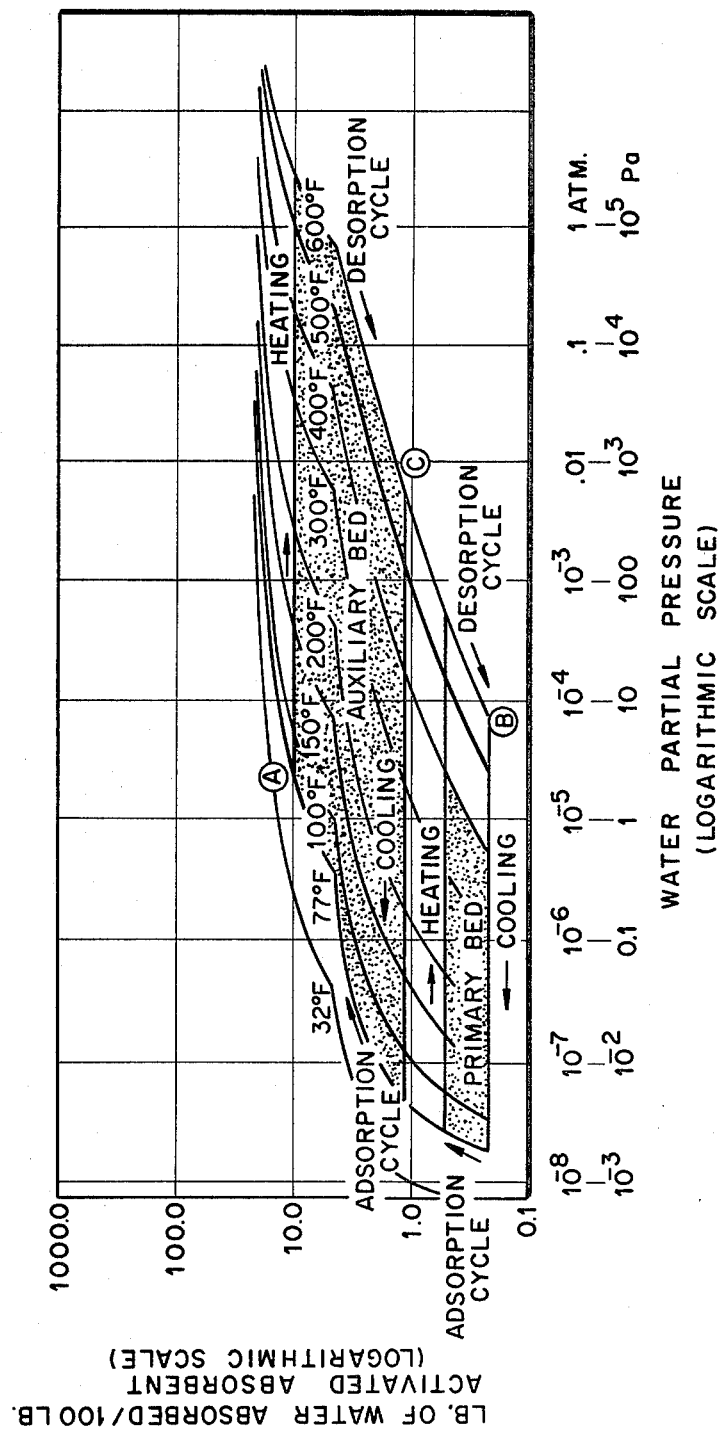
FIG. 3 graphically illustrates a specific regeneration cycle using the FIG. 2 system.

A specific regeneration cycle using the FIG. 2 system is shown in FIG. 3, which is a set of water adsorption isotherms for Linde type 5A (manufactured by Union Carbide Corporation) molecular sieve type pellets, which are composed essentially of crystalline aluminosilicates having a zeolite structure. The cycle of the primary bed is at the lower left; the cycle of the auxiliary bed is above and to the right. If the primary bed has a maximum loading of 0.5 wt. % water, regeneration proceeds as follows:

1. The primary bed is heated to 315° C. (600° F.), raising the $P_w$ to $\sim 5 \times 10^{-4}$ atm.
2. Inert gas, such as helium, heated to a temperature of about 315° C., circulating in the system passes through the primary bed and picks up water (desorption), whereafter it is cooled to at least 25° C. (77° F.), and gives up water on the auxiliary bed (adsorption).
3. The auxiliary bed can pick up water to a loading of $\sim 10$ wt. %. The limit of this system is that the minimum $P_w$ of the hot primary bed (point B in FIG. 3) must always be greater than the maximum $P_w$ of the cold auxiliary bed (point A in FIG. 3) during regeneration. Otherwise, there would be no driving force for transfer of water vapor from the primary bed to the auxiliary bed.
4. When the effluent is cooled to 25° C. (77° F.), the primary bed can dry to as low as $P_w = \sim 2 \times 10^{-8}$ atm.
5. The auxiliary bed can be regenerated by conventional means, such as shown in FIG. 1. If its moist effluent is cooled to a dew point of 0° C. (32° F.), the auxiliary bed will desorb to $\sim 1.1\%$ residual loading (point C in FIG. 3), during its regeneration cycle.

Residual (not recoverable) loadings in the primary bed are kept to 0.2 wt. %. Residual loading in the auxiliary bed is higher, but this is more than offset by the auxiliary bed's smaller size. If "moist" gas (from a fuel recovery system, or other associated system) entering the primary bed for normal drying can be chilled to, say −20° C. (−4° F.), the $P_w$ can be reduced to less than $2 \times 10^{-9}$ atm., and possibly as low as $2 \times 10^{-10}$ atm. This low value for $P_w$ would be adequate for even the most critical applications, such as the CTR tritiated water collection mentioned above.

By inspection of FIG. 3 it is readily apparent that for any given operating temperature, $P_w$ can be reduced by operating at a reduced residual water loading; conversely, for any given residual water loading, $P_w$ can be reduced by operating at a lower temperature. Thus, to obtain inert gas having a given $P_w$, there exist several combinations of operating temperature and residual water loading which will be satisfactory. The best combination for a particular application depends on factors such as size, economics, etc.

Figure 4:
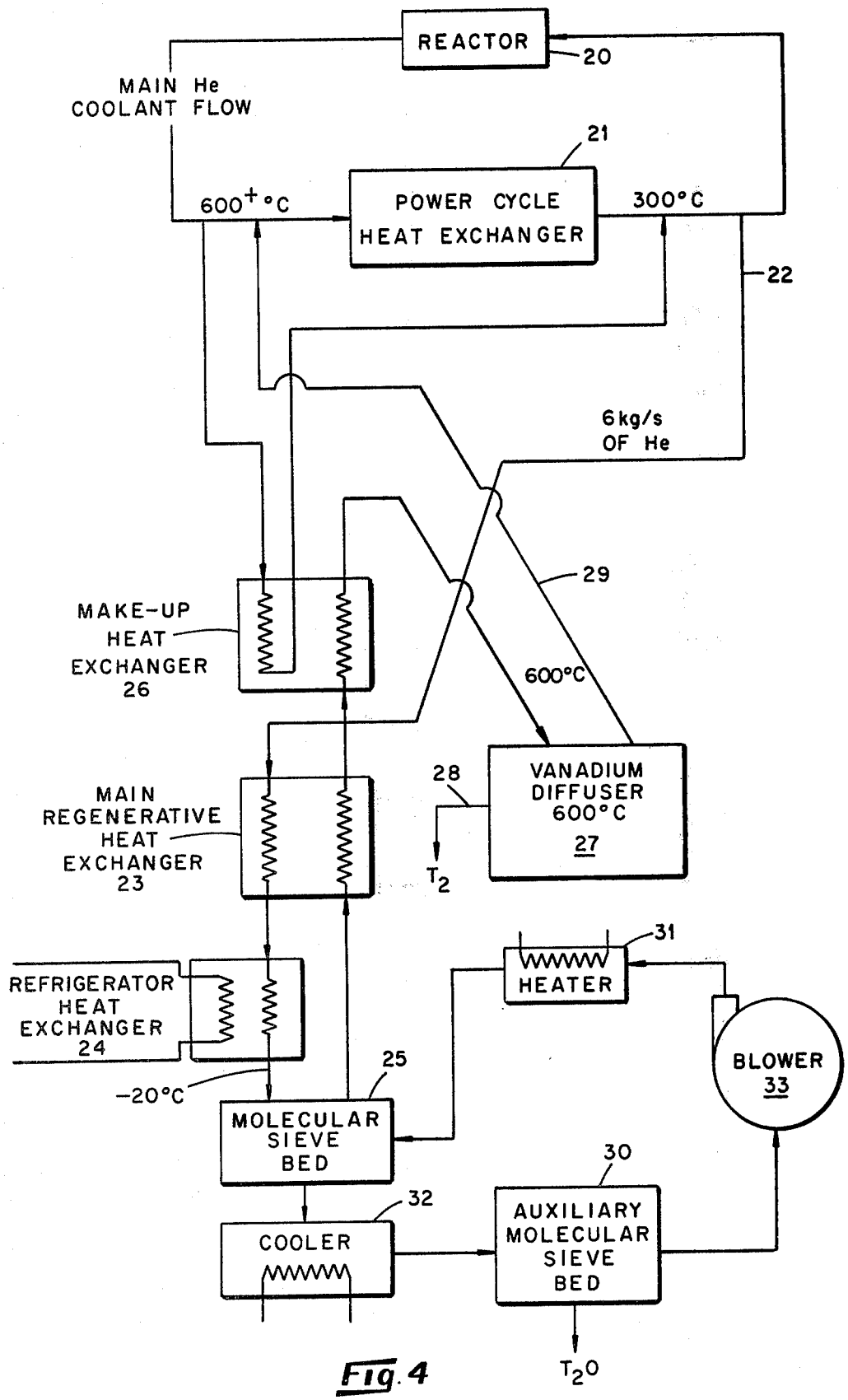
FIG. 4 schematically illustrates a fuel recovery system for a CTR utilizing the invention.

FIG. 4 illustrates an application of the FIG. 2 regeneration system in a fuel-recovery system of a CTR utilizing tritiated water ($T_2O$). The CTR fuel recovery system of FIG. 4 may, for example, be that of a mirror hybrid fusion-fission reactor described in report UCRL-51797 by R. W. Moir et al, University of California, Lawrence Livermore Laboratory, released for public distribution on Oct. 10, 1975.

Referring now to FIG. 4, the fuel recovery system associated with a reactor 20 will process, as follows, helium containing both $T_2O$ and $T_2$ taken downstream of a power cycle heat exchanger 21 at $\sim 300°$ C. via tubing 22:

1. The gas is cooled to $-20°$ C. by a main regenerative heat exchanger 23 and refrigerator heat exchanger 24.
2. Essentially all $T_2O$ is removed by a primary molecular sieve bed 25.
3. The gas is then reheated to 600° C. by the main regenerative heat exchanger 23 and a makeup heat exchanger 26.
4. The gas then passes through a vanadium diffuser 27 wherein part of the $T_2$ diffuses through a bank of permeable vanadium tubes, as indicated by arrow 28 and legend $T_2$.
5. The final effluent from diffuser 27 is returned to the main helium stream via tubing 29.

To prevent fluidization and attrition of the sieve material of the FIG. 4 system, the primary molecular sieve bed 25 requires, for example, an area of 5.2 m². The bed contains 720 kg of type 5A sieve pellets, giving a depth of 20 cm. In this short depth, gas flow is still highly turbulent, and good drying is insured. By operating at $-20°$ C. up to a maximum $T_2O$ loading equivalent to 0.5 wt. % $H_2O$, the bed will dry to an exit partial pressure of $\sim 2 \times 10^{-9}$ atm. of $T_2O$ which is necessary to permit proper operation of the vanadium diffuser 27 for recovery of $T_2$ gas.

The primary bed 25 can be regenerated to a residual loading that is equivalent to $\sim 0.2$ wt. % $H_2O$. This bed will have a total $T_2O$ inventory equivalent to 1200 g of $T_2$, of which 720 g can be recovered and 480 g always stays on the sieve (residual). The bed capacity is equal to 172 days recovery of $T_2O$ for this example. $T_2O$ (and $H_2O$) adsorbed on any molecular sieve bed is held in an essentially solid state, as opposed to a liquid or gaseous stage as in other stages of the process.

To regenerate the molecular sieve bed 25 to a 0.2 wt. % residual loading, an auxiliary molecular sieve bed 30 is added along with a heater 31, cooler 32 and blower 33 so as to form a regeneration system similar to that illustrated in FIG. 2. Helium effluent at 315° C. from the primary bed 25 is cooled to 25° C. and passed through the auxiliary bed 30. The bed 30 contains, for example, 20 kg of type 5A molecular sieve pellets, and the loading is allowed to rise to $\sim 12$ wt. %. The bed 30, in turn, is regenerated at 315° C. in a manner similar to that shown in FIG. 1 and well known to those skilled in the art, and its effluent chilled to $-25°$ C. to collect the $T_2O$. When the auxiliary bed 30 is not in use, its residual $T_2$ content will be 33 g. Appropriate portions of these several systems will be valved off in a manner readily apparent to those skilled in the art whenever another system is in operation.

It has thus been shown that the present invention provides an improved method and apparatus for regenerating molecular sieve drying beds, with the main advantage being that the partial pressure of water ($P_w$) can be reduced to the $10^{-9}$ to $10^{-10}$ atm. range which is of significance in certain CTR applications where tritiated water must be collected and kept at very low partial pressure.

While the invention has been described with specific reference to the regeneration of molecular sieve drying beds, the improved regeneration system is generic and can be applied to drying agents other than molecular sieves.

Fusion reactor components previously known as Controlled Thermonuclear Reactor (CTR) Systems are now also being referred to by many in this field as Magnetic Fusion Energy (MFE) Systems.

While particular embodiments of the invention have been illustrated and described, modifications will become apparent to those skilled in the art, and it is intended to cover in the appended claims all such modifications as come within the spirit and scope of the invention.

What I claim is:

1. An improved method for removing tritiated water from a fuel recovery system of a controlled thermonuclear reactor while maintaining same at a partial pressure of water ($P_W$) not greater than $10^{-8}$ atmospheres, comprising the steps of: providing the fuel recovery system with a molecular sieve drying bed through which a gas containing tritiated water is circulated to remove a substantial portion of the tritiated water from said gas and regenerating the molecular sieve drying bed; the step of regenerating the bed comprising: circulating a hot inert gas through the molecular sieve drying bed to desorb tritiated water held on the bed, passing the inert gas plus tritiated water vapor through a cooling means where it is cooled to a temperature below about 25° C. (77° F.), directing the thus cooled inert gas plus water vapor through an auxiliary molecular sieve bed which adsorbs the water vapor from the inert gas thereby drying the inert gas, and heating the thus dried inert gas for recirculation thereof through the first-mentioned molecular sieve drying bed.

2. The method defined in claim 1, wherein the inert gas and water vapor is cooled to not more than about −20° C. (−4° F.), and wherein the partial pressure of water ($P_W$) is reduced to about $10^{-9}$ to $10^{-10}$ atmospheres.

3. The method defined in claim 1, wherein the steps of regenerating the primary molecular sieve bed can be carried out by selecting appropriate combinations of the residual loading of water and the operating temperature for a particular application, wherein the partial pressure of water in the moist inert gas is reduced to at least about $10^{-9}$ atm.

4. The combination of a fuel-recovery system of a controlled thermonuclear reactor, which utilizes tritiated water and a primary molecular-sieve drying bed, and an apparatus, which regenerates said primary bed and maintains a partial pressure of water ($P_W$) not greater than $10^{-8}$ atmospheres in said primary bed; said primary bed being constructed such that a gas containing tritiated water is circulated therethrough and functions to remove a substantial portion of the tritiated water from the gas and constructed to have an inlet and an outlet; said regeneration apparatus including an auxiliary molecular-sieve bed having an inlet and an outlet, a cooler positioned flowwise intermediate said primary bed and said auxiliary bed and flow connected to said outlet of said primary bed and to said inlet of said auxiliary bed, a heater positioned flowwise intermediate said auxiliary bed and said primary bed and flow connected to said outlet of said auxiliary bed and said inlet of said primary bed, and means for circulating a heated inert gas sequentially through said primary bed, said cooler, and said auxiliary bed so that the heated inert gas desorbs tritiated water held on said primary bed creating a moist inert gas which is cooled and passed through said auxiliary bed which adsorbs the tritiated water from the moist inert gas thereby drying the inert gas which is again heated and circulated through said primary bed thus regenerating said primary bed and maintaining therein a partial pressure of water ($P_W$) no greater than $10^{-8}$ atmospheres.

5. The apparatus defined in claim 4, wherein said means for circulating an inert gas comprises a blower positioned intermediate said auxiliary bed and said heater.

6. The apparatus defined in claim 4, wherein said inert gas is selected from the group composed essentially of helium, argon, gas not adsorbed by the molecular sieve bed, and mixtures thereof.

7. The apparatus defined in claim 6, wherein said primary and auxiliary bed contain molecular sieve materials composed essentially of crystalline alumino-silicates having a zeolite structure.

8. The apparatus defined in claim 4, wherein said moist inert gas has a temperature of not lower than about −20° C. and the partial pressure of water ($P_w$) is about $10^{-9}$–$10^{-10}$ atmospheres.

* * * * *